United States Patent

Blas

[11] Patent Number: 6,161,503
[45] Date of Patent: Dec. 19, 2000

[54] WATER PRESSURE ACTIVATED ANIMAL FOOD DISPENSER

[76] Inventor: Antonio Blas, 2503 L. St., National City, Calif. 91940

[21] Appl. No.: 09/399,025

[22] Filed: Sep. 21, 1999

[51] Int. Cl.$^7$ .................................................. A01K 5/02
[52] U.S. Cl. ...................................... 119/51.5; 119/51.12
[58] Field of Search .............................. 119/51.01, 52.1, 119/53, 56.1

[56] References Cited

U.S. PATENT DOCUMENTS

| | | | |
|---|---|---|---|
| 4,640,229 | 2/1987 | Swartzendruber et al. | 119/51.5 |
| 4,644,903 | 2/1987 | Shaver | 119/51.12 |
| 4,733,634 | 3/1988 | Hooser | 119/51.12 |
| 4,964,535 | 10/1990 | Curwen | 119/56.1 |
| 5,555,842 | 9/1996 | Chocola et al. | 119/51.11 |
| 5,588,394 | 12/1996 | Balistreri | 119/51.11 |

Primary Examiner—Thomas Price
Attorney, Agent, or Firm—Donn K. Harms

[57] ABSTRACT

An automatic animal feeding and watering device for home or animal industry use. The device is remotely activated by the activation of a water dispensing system like a home sprinkler system which turns an impeller while the water is flowing. While the watering system is activated the flowing water rotates an impeller which in turn dispenses food stored in a hopper to the animal at the same time water is flowing into a bowl. The amount of food dispensed from the device may be adjusted by closure of apertures interfacing with the impeller powered finned roller or by applying a brake to slow the rotation of the impeller and roller.

11 Claims, 2 Drawing Sheets

WATER PRESSURE ACTIVATED ANIMAL FOOD DISPENSER

BACKGROUND OF INVENTION

1. Field of Invention

The present invention relates to a device for remote feeding of animals living in an enclosure. More particularly, it relates to a device which is powered by conventional water pressure and dispenses solid food into a food dish for the animal while concurrently dispensing water from the supply conduit to the animal. The device requires no wires or electrical power in the cage or animal pen to remotely operate the feeder since the keeper or home user need only turn on the water supply to the enclosure which is attached to the device to cause the device to dispense both food and water to the animal. The device provides therefor a safe and convenient way for homeowners to feed their pets by simple attachment to a timed watering device such an automatic sprinkler. The device may be used in instances such as kennels and animal control pens which lack electric power to the individual enclosures and provide an easy method to feed the animals without visiting each enclosure.

Safety is enhanced in both home and industrial use in that, the device may be used in such pens without worry that the animal could somehow become injured from an electric charge since it has no batteries or wires. This lack of batteries and power at the site of the food and water dispensing additionally provides for reduced maintenance since no batteries or power requirements must maintained.

2. Prior Art

The feeding of caged and penned animals has been a requirement since man began to domesticate animals and keep them for companionship and end products. As with any living creature, domestic and household pets and institutionally caged animals need food and water to continue living. Since they are unable to fend for themselves due to the very nature of their enclosure, they must be regularly fed by their keepers.

Many a homeowner with pets has been delayed in arriving home and found a ravenous and thirsty dog greeting them at the door long past their regular feeding time. A simple attachment of the device herein disclosed, to a timed watering system such as a sprinkler with an automatic timer would alleviate this vexing problem. When the sprinkler or automatic timer is activated, the device dispenses food to the animal along with water thereby allowing the pet owner relief from exacting time schedules to feed the pet.

In the case of the kennel and animal control industry regular feeding and watering is also a must and a time consuming affair. Cats and especially dogs who are picked up in most areas of the country by officers of animal control are generally located in pens at an animal control compound during a detention period. They must be fed and watered regularly by the keepers which is both labor and schedule intensive keepers must make sure the animals are timely fed and watered to maintain the health of the creatures in their charge.

The same is true in the kennel industry where dogs and cats are voluntarily temporarily located in the same type of penned enclosures by their owners. Though not the same type of facility as the animal control type of enclosures, the commercial kennels still have the same responsibility to adequately feed and water the animals in their charge on a regular basis.

Most animal control facilities in the United States were built many years ago when standards of care were not as high as the current standards. These facilities generally lack a power supply in the individual cells or enclosures however they almost always have some sort of water supply in the general proximity to the cages if not in the individual cages. While the proximity of the water spigot provides a manner to provide water to the animals it does not provide any aid in food dispensing to the animals. Further, most such spigots are attached to a water supply that is pressurized but requires that each individual spigot be turned on an off whenever water is supplied to the animal. While making the task of watering the animals a simple matter of turning on the spigot, it is still a requirement that food and water must be individually dispensed to the animals at appropriate times which is very labor intensive. The same is true of most kennels as they too suffer from aged facilities causing rise to a very labor intensive and time consuming process to feed and water the animals in their care.

Currently, the keeper must individually visit each and every animal cell in the kennel or animal control facility. On such visits the keeper turns the spigot in each cell to provide water from the pressurized system to a bowl in the cell. When solid food is dispensed to the animals the same cell by cell visitation takes place to dispense the required amount of food to each individual animal in the required amounts for the size of the animal being kept.

Such a time consuming task as noted earlier is very labor intensive and allows the keepers little time to visit with the animals in a kennel situation since they are always out feeding and watering individual animals. By the time they finish with the last animal in their care there is little time to waste before the needs of the first one need be addressed since it was so long since they fed or watered the animal. Being so labor intensive the current systems also raise cost and lower the amount of time of human companionship that may be provided the animal for exercise or play since costs to run the facility are so high due to the feeding requirements.

The device as herein disclosed addresses a number of older kennel and animal control facilities. First, the lack of electrical power to the individual cells to power a feeding device is overcome without the need for very expensive remodeling of the facility to add power. Second, the labor intensive individual visits to each animal enclosure over a long period of time is obviated by the automatic feeding and watering of all of the animals in the facility at once.

Prior art has attempted to address some of the aforementioned problems and solutions but without great success.

U.S. Pat. No. 4,665,862 (Pitchford) teaches a timed automatic pet food and water dispenser for animals. However Pitchford requires batteries and or electrical power in the enclosures in which it is located to power the device. It thus requires that homeowners wire their garage or home to run the device and also requires the rewiring of older kennels and animal control facilities or batteries to be left in the devices which must be maintained and could cause injury to the animal if they leak.

U.S. Pat. No. 5,588,394 (Balistreri) provides the remote feeding of animals on a cyclical basis using an in-cell style apparatus. Balistreri however, is a complicated apparatus requiring the use of timers, levers, a ballast tank to power the device and other valves and conduits all requiring maintenance and subject to breaking. Ballistreri also cites an important aspect of the device being a microprocessor and electronic controls which as mentioned. Such devices require an in-cell electronic power source to power and operate the device which as note is not generally available in older facilities and increases the cost of the device itself.

Other devices attempt to solve the problem of labor automatic feeding of pets and intensive animal food and water dispensing but fail to address the lack of electrical power and maintenance requirements of the machines themselves if they have on board electronics. As such, there exits a continuing need for a remote controlled animal feeder that is easily installed in antiquated animal care facilities lacking power and that needs little maintenance itself. The device should be easily controlled by the operators remotely by the setting of a timer or manual remote initiation of the operation of the device to dispense food and water to the animals.

SUMMARY OF THE INVENTION

Applicants' device is an easily manufactured and utilized apparatus, which provides for the remote dispensing of food and water to pets of homeowners on an automatic basis when attached to a timed water dispenser. The device also handles the remote and automatic feeding of animals who are in individual cells in an animal control facility or a kennel. The device needs no electrical power to operate since it uses the pressure of the water supplying water to the device to operate. It is thus easily installed in the home by attachment to an automatic supply such as a timed sprinkler system. It also will work well in even the most antiquated animal control facilities so long as a water supply through a spigot or other conduit is available in proximity to the animal enclosure in which it is located.

In the simplest embodiment, the device features a water input conduit which is attachable to a pressurized water supply system. When pressurized water enters the device through the input conduit it runs over an impeller in a cavity inside the device and then exits to a water bowl for the animal. The impeller or other means of imparting rotational movement communicates that rotational power to a bladed or cork-screw shaped impeller which is elongated over the length of an exit aperture at the bottom of a hopper of dry animal food.

In operation the pressurized water entering the device causes the cork screw shaped impeller to rotate which in turn causes dry animal food that falls into the blades of the rotating cork screw shaped impeller to rotate with it and fall into a dish on through an exit aperture at-the opposite side from the bottom of the hopper. As long as the water is pressurized and running though the device, food is dispensed from the hopper to the bowl underneath the device by the rotating cork screw shaped gear.

The amount of dry food so dispensed may be adjusted for the size of the animal by adjusting the length of time that the device is provided pressurized water and thus allowing more or less dry food to be rotationally deposited in the bowl. Or, alternatively, an elongated flow regulating means may be attached to the elongated cork screw shaped dispensing gear. The flow regulating means would have apertures of differing sizes in it to allow more or less food to fall from the hopper on the rotating cork screw gear and thus allow more or less food per rotation to fall to the bowl below. Or, alternatively, the elongated flow regulating means could have adjustable apertures located in it that slidably adjust to close or open each aperture more or less and thereby provide an adjustment means for the regulation of flow of solid food from the device while pressurized water powers it.

The pressurized water supply can be centrally operated in most cases to be on, or off, using a single valve. Since most older facilities are plumbed in such a manner it is easy to control all of the conduits feeding the individual animal cells or conduits by turning the valve supplying pressurized water thereto on or off. When turned on, any animal feeder attached to and communicating with the pressurized water supply will dispense water and cause the dispensing of dry food so long as the water is turned on and pressurized. Once the main valve is turned to the off position, the feeders attached to the conduit will bleed the pressure from the system until dry and cease to dispense either water or dry food therefrom.

As such, even a homeowner with no power to the garage or dog house and the most antiquated facilities with no power to the cells, may be provided an automatic feeding unit that may be remotely controlled by the operator to dispense and cease dispensing food and water by a simple sealed attachment to the existing water supply conduits already available in such facilities. There are few if any parts to break down and no electrical requirements for the device to operate that are onboard the device. This eliminates most maintenance problems encountered on more complicated devices as well as eliminating the potential shock and chemical hazards to users and animals from batteries and grid fed electrical devices.

This unique design of the disclosed device also provides for the easy inclusion into private homes, backyard dog enclosures, and into thousands of old and antiquated animal control facilities which lack the wiring needed for conventional and prior electrically-powered devices, and lack the funds to remodels to provide it. The device can thus be used to improve the timed feeding of private pets in homes and also in the animal control industry efficiency with the provision of better care to the animals using the extra time and manpower released by the use of the device to interact with and care for the animals.

An object of this invention is to provide an animal feeding device that is easily installed in by homeowners by simple attachment to a timed water dispenser such as a sprinkler system.

An object of this invention is to provide an animal feeding device that is easily attached to antiquated animal enclosures or those lacking electrical power.

Another object of this invention is to provide for-better care for pets and penned animals though automatic feeding that can be remotely activated.

A further object of this invention is the provision a device for feeding animals that can be remotely activated and deactivated by turning a water supply valve communicating water to the device on or off.

An additional object of the invention is to provide for an animal feeding device that is remotely activated that requires no electrical power from batteries or power grids.

Further objects of the invention will be brought out in the following part of the specification, wherein the detailed description is for the purpose of fully disclosing the invention without placing limitations thereon.

BRIEF DESCRIPTION OF DRAWING FIGURES

DETAILED DESCRIPTION OF THE PREFERRED EMBODIMENTS OF THE INVENTION

Figure 1:
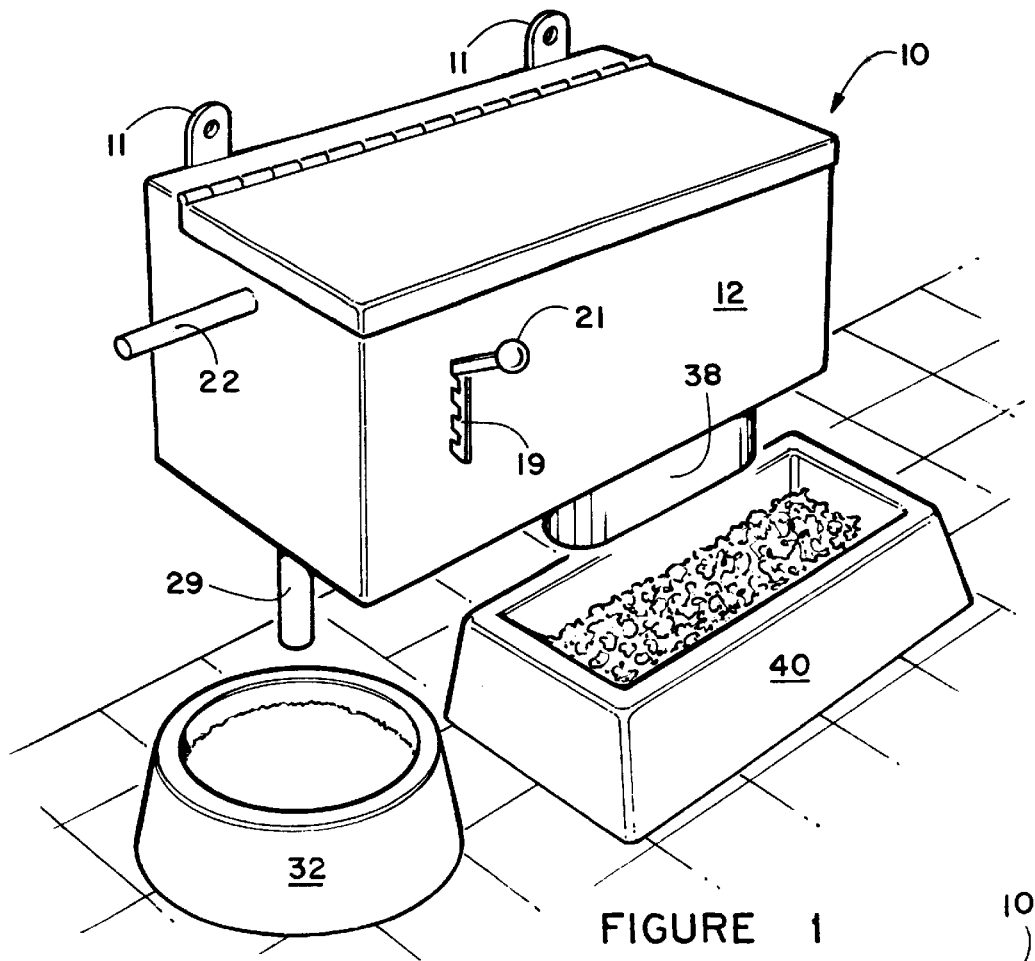
FIG. 1 is a perspective view of the animal feeding device in a typical configuration wall mounted over feeding bowls.
Figure 2:
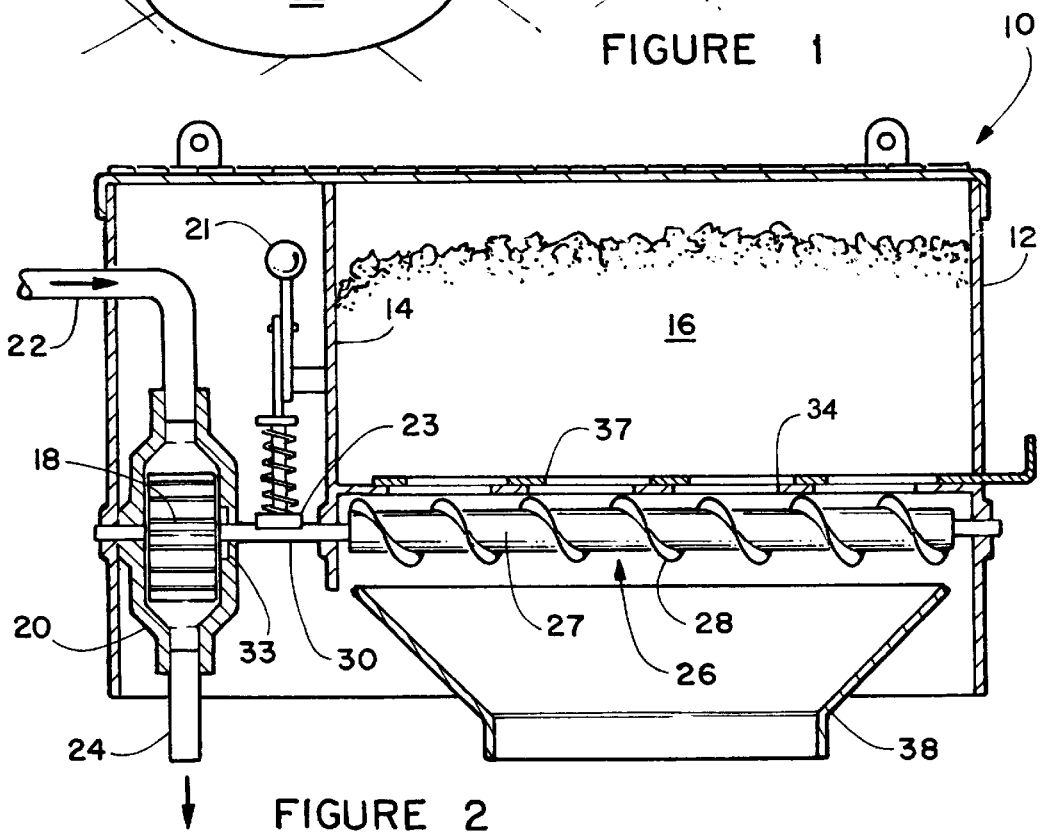
FIG. 2 is a frontal cut away view of the device.
Figure 3:
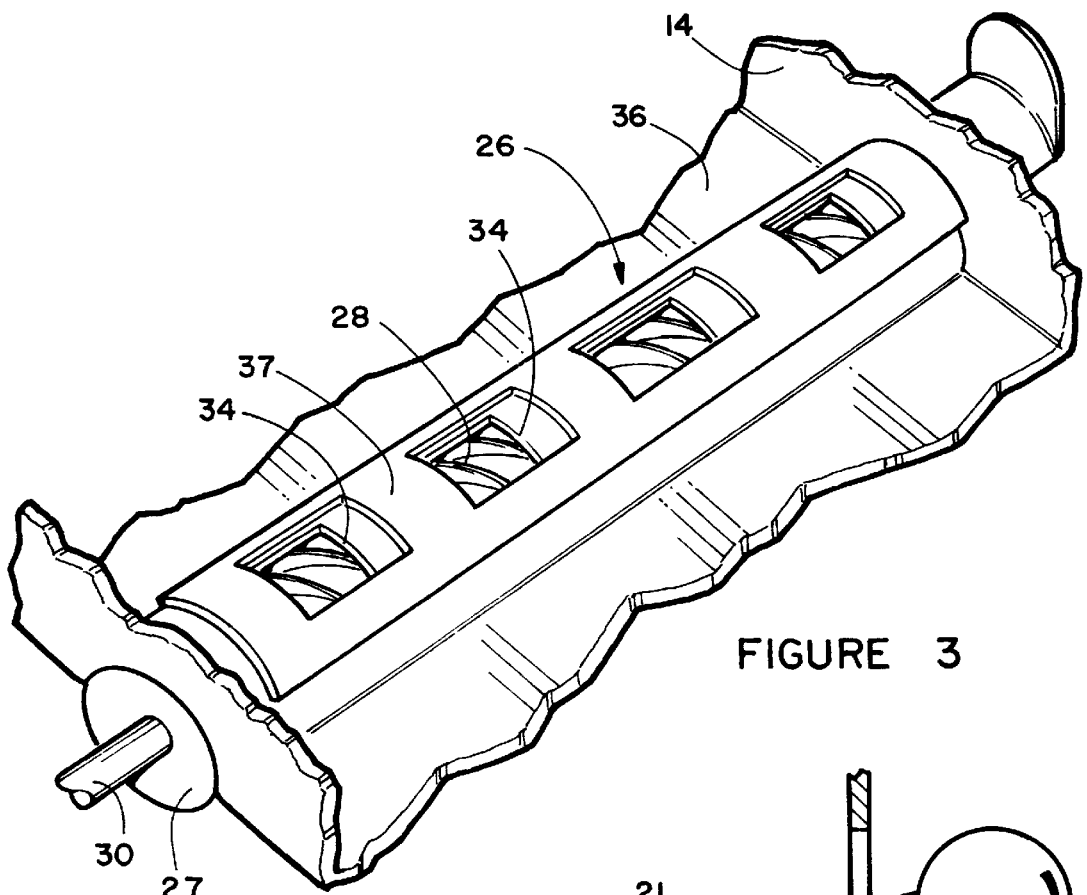
FIG. 3 depicts the impeller of the device and aperture adjustment.

Referring now to the drawing FIGS. 1–4, specifically FIG. 1 depicts a perspective view of the water pressure powered animal feeding device 10 disclosed herein as it would be situated over the animal feeding and watering bowls in a typical animal pen enclosure using mounting tabs 11 for screw mounting or other conventional manner of mounting.

The device 10 features a outer housing 12 that encloses a food bin 14 that would be sized to accommodate the conventional bag of dry animal food which is typically in the forty to sixty pound range. Of course the food bin 14 could be sized larger or smaller depending on the reservoir of dry animal food 16 that is desired for storage.

Also depicted inside the housing 12 is an impeller 18 situated inside of an internal conduit 20 that communicates with an intake conduit 22 and a dispensing conduit 24. The impeller 18 is attached to and communicating with, a rotating food dispenser 26 which in the current best embodiment is an elongated cylinder 27 with cork screw style fins 28 about the outside circumference of the elongated cylinder 27.

The elongated cylinder 27 communicates with the impeller 18 through a conventional drive shaft 30 or other means of communication of the motion of the impeller 18 to the elongated cylinder 27. When pressurized water is allowed to flow into the intake conduit 22 over the impeller 18 it causes the impeller 18 to rotate in a conventional fashion of a water wheel. The impeller 18 rotates while the intake conduit 22 is pressurized and imparts this rotation to the drive shaft 30 and the communicating elongated cylinder 27. Conventional seals 33 maintains water inside the internal conduit 20 while it is flowing over the impeller 18. Water flowing over the impeller 18 exits the device 10 through the dispensing conduit 24 and into a properly located water container 32.

The elongated cylinder 27 is situated at the bottom of the food bin 14 and communicates with the inside of the food bin 14 through an aperture 34 in the bottom wall 36 of the bin 14. In that manner food 16 in the food bin 14 is continually gravity fed toward the aperture 34. While the impeller 18 is being provided with a pressurized water supply it rotates and imparts that rotation to the elongated cylinder 27. This provides the means for rotational motion of the elongated cylinder 27 which in turn rotates in communication with the aperture 34. The food 16 being gravity fed toward the bottom of the bin 14 naturally deposits into the areas between the fins 28 and then rotates to the other side of the cylinder 27. Once on the other side of the cylinder 27 gravity again causes the food 16 to fall downward and through a food dispensing conduit 38 and into a properly situated food bowl 40 located under the food dispensing conduit 38.

As can readily be discerned, as long as water is supplied to the intake conduit 22 the impeller 22 turns and causes dry food 16 to fall onto the rotating cylinder 27 between the cork screw shaped fins 28 and to thereafter fall into the food bowl 40 through the food dispensing conduit 38. The supplied water of course also proceeds through the device and into the water container 32 when water is so supplied.

Figure 4:
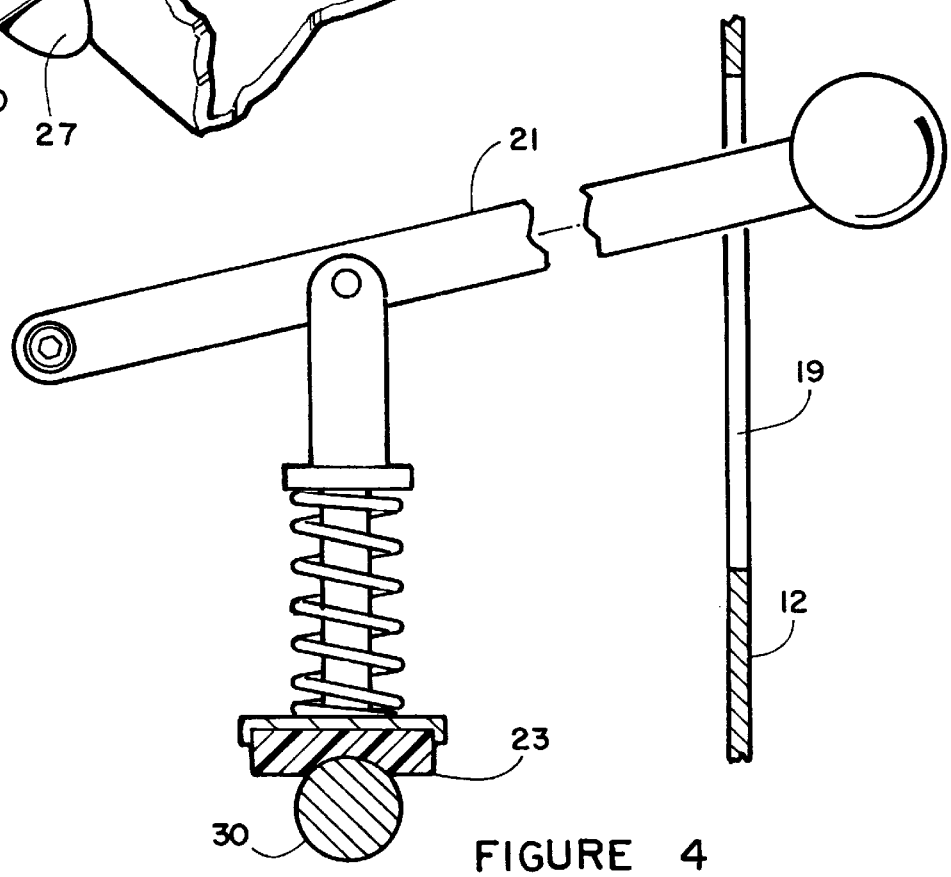
FIG. 4 shows an impeller speed adjustment to fine tune feeding amounts.

The impeller 18 may be fine tuned for speed by the engagement of an adjustable brake means depicted in FIG. 4. The 21 handle 21 when lowered places increased pressure on a friction pad 23 using biasing means such as a spring. The friction pad 23 applies pressure to the shaft 30 thereby slowing the turning of the impeller 18 which in turn slows the fins 28 from turning and dispensing food. Using this means of adjustment of the amount of food dispensing, the owner can provide more or less food to the animal by adjustment of the handle 21 into different points of engagement the slot 19.

A second means of adjustment of the amount of food dispensed is provided by the adjustable apertures 34 using slideable or other closures 37 located in the apertures 35. By closing the sliceable closures 37 to make the apertures 34 less food falls between the fins 28 causing more or less food to be dispensed depending on the sized of the apertures 34 that the user determines using the closures 37.

The user is thus provided with a long term adjustment of food amount dispensed with the closures 37 on the apertures 34 and a short term adjustment when needed by increasing or decreasing the pressure provided by the friction pad 23. The two means of adjustment disclosed are the current best mode. However, both such means for adjustment of the amount of food dispensed could be modified, or other means of adjustment could be used, and such are anticipated. As noted, the device will only function when attached to a water supply that is flowing and once water ceases to be supplied to the device all dispensation of food and water ceases. The device therefor is easily attached to a home sprinkler system or many other automatic water dispensing systems and use in combination with a wide variety of such systems in homes and industry is anticipated.

While all of the fundamental characteristics and features of the animal feeder activated and powered by water pressure herein disclosed have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. An automatic food and water dispenser for animals comprising:
    a water dispensing conduit having an input and output end and an impeller rotatably positioned between said input and output ends, said impeller being rotated when water flows through said conduit;
    a source of pressurized water connected to said input end of said conduit;
    a food storage means for storing, said food storage means having a top, bottom and side walls with an elongated food dispensing slot in the bottom thereof;
    a food disbursement means rotatably positioned beneath cooperating with said elongated dispensing slot for dispensing food from said elongated slot when rotated; and
    shaft means interconnecting said impeller and said food disbursement means whereby when said pressurized water flows through said conduit said impeller rotates causes said disbursement means to likewise rotate thereby dispensing food from said food storage means.

2. The invention as defined in claim 1 additionally comprising bias means associated with said impeller for selectively controlling the speed of rotation of said impeller and disbursement means relative to the flow of water.

3. The invention as defined in claim 2 wherein said bias means is adjustable.

4. The invention as defined in claim 2 wherein said bias means is a spring.

5. The invention as defined in claim 2 wherein said bias means is a selectively controllable brake.

6. The invention as defined in claim 1 further comprise a valve means for controlling the flow of water through said conduit.

7. The invention as defined in claim 1 wherein said food disbursement means comprises an elongated cylinder.

8. The invention as defined in claim 7 wherein said disbursement means comprises adjustment means for controlling the amount of food dispensed during rotation thereof.

9. The invention as defined in claim 8 wherein said adjustment means for controlling the amount of food dispensed comprises a plurality of selectively sized compartments along the surface of said disbursement means.

10. The invention as defined in claim 9 wherein said selectively sized compartments having translatable covers infinitely positionable between an open compartment and a closed compartment.

11. The invention as defined in claim 1 wherein said disbursement means is an elongated cylinder with cork screw style fins along its length.

* * * * *